United States Patent
Winckelmann et al.

(10) Patent No.: US 8,117,165 B1
(45) Date of Patent: Feb. 14, 2012

(54) DISK-TO-DISK BACKUP OF DATABASE ARCHIVE LOGS

(75) Inventors: Luke Winckelmann, Bad Homburg (DE); Manfred A. Buchmann, Salem (DE); Alvin Richards, Chapel Hill, NC (US); Alan S. Driscoll, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 393 days.

(21) Appl. No.: 12/113,172

(22) Filed: Apr. 30, 2008

(51) Int. Cl.
*G06F 17/30* (2006.01)

(52) U.S. Cl. ........................................ 707/640; 707/661

(58) Field of Classification Search .......... 707/638–639, 707/649, 662, 672, 640, 661
See application file for complete search history.

(56) References Cited

U.S. PATENT DOCUMENTS

| | | | |
|---|---|---|---|
| 5,602,702 A | 2/1997 | Maegawa et al. | |
| 5,617,527 A | 4/1997 | Kressin et al. | |
| 5,774,720 A | 6/1998 | Borgendale et al. | |
| 5,867,686 A | 2/1999 | Conner et al. | |
| 6,640,278 B1 | 10/2003 | Nolan et al. | |
| 6,983,303 B2 | 1/2006 | Pellegrino et al. | |
| 7,069,278 B2 * | 6/2006 | Telkowski et al. | 1/1 |
| 7,617,262 B2 * | 11/2009 | Prahlad et al. | 1/1 |
| 2002/0019908 A1 | 2/2002 | Reuter et al. | |
| 2002/0083216 A1 | 6/2002 | Hickson et al. | |
| 2002/0174129 A1 | 11/2002 | Aldrich et al. | |
| 2002/0184207 A1 | 12/2002 | Anderson et al. | |
| 2002/0188592 A1 | 12/2002 | Leonhardt et al. | |
| 2002/0191619 A1 | 12/2002 | Shafer | |
| 2003/0225800 A1 | 12/2003 | Kavuri | |
| 2004/0133718 A1 | 7/2004 | Kodama et al. | |
| 2004/0214561 A1 | 10/2004 | Date et al. | |
| 2005/0010620 A1 | 1/2005 | Silvers et al. | |
| 2005/0033757 A1 | 2/2005 | Greenblatt et al. | |
| 2005/0060693 A1 | 3/2005 | Robison et al. | |
| 2006/0063519 A1 | 3/2006 | Rajaram | |
| 2006/0215700 A1 | 9/2006 | Zayas | |
| 2008/0263112 A1 | 10/2008 | Shaath et al. | |

FOREIGN PATENT DOCUMENTS

| | | |
|---|---|---|
| EP | 1693757 | 8/2006 |
| WO | WO-92/17838 | 10/1992 |

OTHER PUBLICATIONS

"Network appliance powers up the storage grid-world's first dynamic virtualization engine". CIMdata PLM Industry Summary Online Archive. Cimdata Newsletter 2004. www.cimdata.com/newstetter <http://www.cimdata.com/newsletter>.
"Introduction to Data ONTAP 7G". Network Appliance, Inc. Oct. 2005, pp. 1-6.

* cited by examiner

*Primary Examiner* — Mohammad Ali
*Assistant Examiner* — Huawen Peng
(74) *Attorney, Agent, or Firm* — Perkins Coie LLP

(57) ABSTRACT

An archived log backup solution is introduced to perform backups of archived database logs from a primary storage location towards a secondary storage location on disk-to-disk basis. The backed up archived logs are organized on the secondary in such a way that allows recovering a database from these logs by directly mounting the secondary storage location to a host where the archived logs are needed in order to perform a recovery. In addition, the archived log backup solution is implemented in such a way that backup network traffic is separated from the servers and their network.

12 Claims, 7 Drawing Sheets

DISK-TO-DISK BACKUP OF DATABASE ARCHIVE LOGS

FIELD OF THE INVENTION

At least one embodiment of the present invention pertains to network storage systems, and more particularly, to a technique for facilitating storage management for business applications.

BACKGROUND

A storage server is a special purpose processing system used to store and retrieve data on behalf of one or more clients on a network. A storage server operates on behalf of the one or more clients to store and manage shared data in a set of mass storage devices, such as magnetic or optical storage-based disks or tapes. A conventional storage server includes a storage operating system that implements a file system to logically organize data as a hierarchical structure of directories and files on the disks. A file system is any organization of data in a structured manner, which can be, but is not necessarily, organized in terms of a structured (e.g., hierarchical) set of stored files, directories and/or other types of data containers. Data stored by a storage server may be stored in the form of multiple blocks that each contains data. A block is the basic unit used by a file system in a storage server to manipulate and transfer data and/or metadata. In many systems, a block size of 4 KBytes is used, although other block sizes can also be used.

In conventional storage systems, the physical storage devices may be organized into one or more groups of disks (e.g., redundant array of inexpensive disks (RAID)). These disks, in turn, define an overall logical arrangement of storage space, including one or more storage volumes. A storage volume is any logical data set that is an abstraction of physical storage, combining one or more physical storage devices (e.g., disks) or parts thereof, into a logical storage object, and which is managed as a single administrative unit, such as a single file system. A volume may be defined from a larger group of available storage, such as an aggregate.

The physical storage device(s) underlying a storage volume may vary in different implementations. In some instances, a storage volume as described herein can be a flexible storage volume, i.e. a volume that is flexibly associated with the underlying physical storage device(s). In other instances, a storage volume as described herein can be a traditional volume, i.e., a volume that is mapped directly and inflexibly to the underlying physical storage device(s).

When a database is running on one or more of storage volumes, it may keep an online redo log that keep tracks every operation performed on the database, such as insertion, modification, or deletion of tables and/or data items in the database, for recovery purposes. The size of the online redo log is limited because the smaller the online redo log is, the less time it takes to start up the database in a case of recovery. Consequently, the online redo log is routinely overwritten when its size reaches a preset limit.

While keeping an online redo log, the database may run under either archive mode or no-archive mode. When running in archive mode, the database archives the online redo log either manually or automatically before the log is overwritten. When running in no-archive mode, online redo log can (and will) be overwritten without making sure it is saved, implying that the database cannot be recovered even if backups were made.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

The approach is illustrated by way of example and not by way of limitation in the figures of the accompanying drawings in which like references indicate similar elements. It should be noted that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

An archived log backup solution is introduced to perform backups of archived database log files from a primary storage location towards a secondary storage location on disk-to-disk basis. Here, disk-disk backup copies the contents of one computer hard disk at the primary storage location to another hard disk at the secondary storage location. Often, the contents of the disk at the primary storage location are written to an image file and the disk at the secondary storage location is loaded with the contents of the image. The backed up archived log files on the secondary storage location are structured in the same way as their originals on the primary storage location (before applying the primary retention period), like in a file based backup solution, so that they can directly be used as a source for the database recovery. This allows recovery of the database from these logs by directly mounting the secondary storage location to a database host where the archived logs are needed in order to perform the recovery. Such recovery can be done without the potentially time consuming task to locate the necessary archived logs on the backup devices and to restore them to the primary. In addition, the archived log backup solution is implemented in such a way that, like in a snapshot based solution, backup network traffic is separated from the hosts (servers) and their network. Consequently, such backup solution does not impose any additional burden on the traffic of the network.

Figure 1:
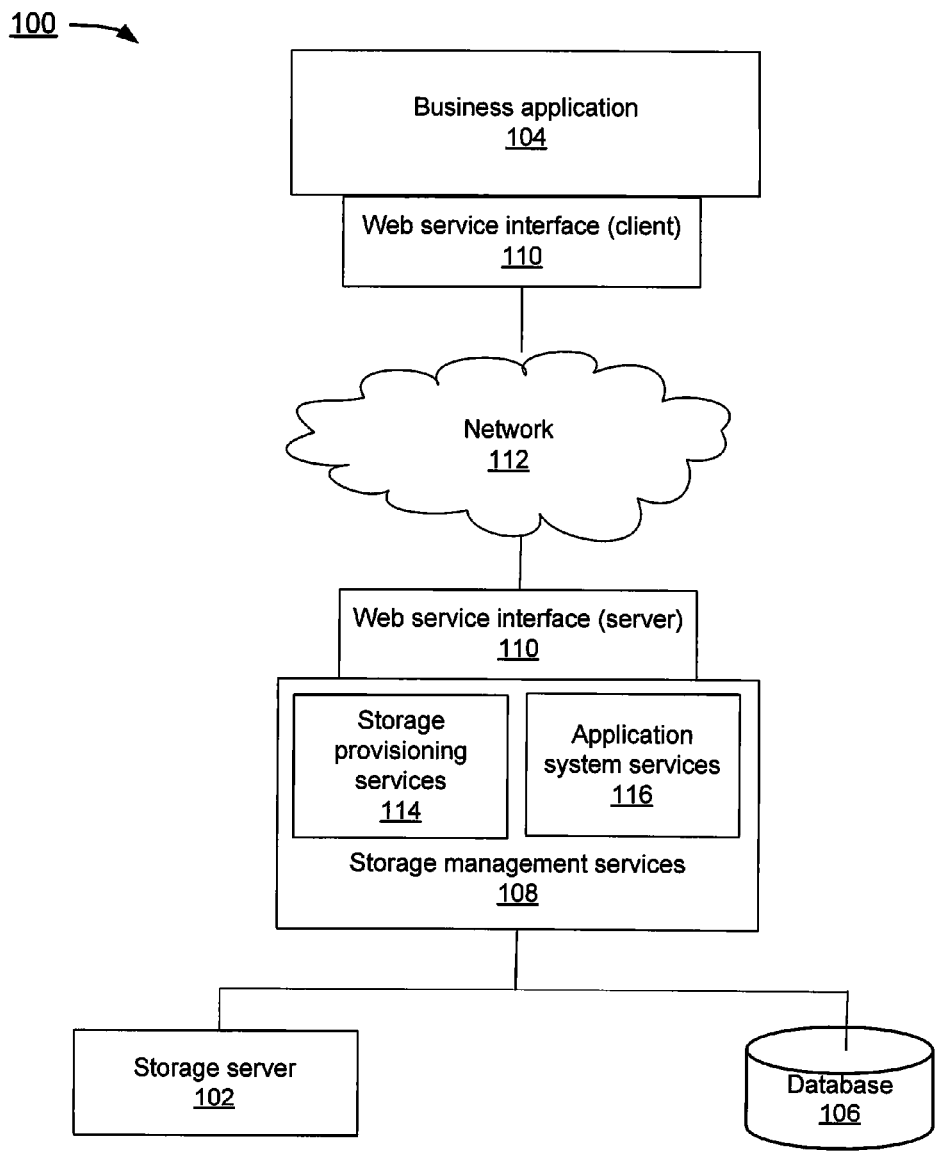
FIG. 1 illustrates an example of a system for providing storage management functionalities to business applications as Web services.

A Web service (also Web Service) is a software component or system designed to support interoperable machine to machine interaction. Web services can be accessed over a network, such as the Internet, and executed on a remote system hosting the requested services. Web service encompasses many different systems, but in common usage the term refers to clients and servers that communicate using XML messages that follow the SOAP standard. Common in both the field and the terminology is the assumption that there is also a machine readable description of the operations supported by the server written in the Web Services Description Language (WSDL). The latter is not a requirement of a SOAP endpoint, but it is a prerequisite for automated client-side code generation in many Java and .NET SOAP frameworks FIG. 1 illustrates an example of a system 100 for providing storage management functionalities to business applications as Web services. Although the diagrams depict components as functionally separate, such depiction is merely for illustrative purposes. It will be apparent to those skilled in the art that the components portrayed in this figure can be arbitrarily combined or divided into separate components.

In the example of FIG. 1, the configuration 100 includes a storage server 102, which includes a logical aggregation of physical data storage (not shown), a business application (software) 104, which implementation requires the deployment of an underlying database 106 (which can be any type of database, relational or non-relational) via the storage server 102, a set of storage management services (functionalities) 108 for the management and operation of a storage volume via the storage server 102, a Web service interface 110 that provides the storage management services 108 to the business application 104 as Web services accessible over a network 112.

In the example of FIG. 1, business application 104, database 106, Web services 108, and Web service interface 110 run on a host (not shown). Such host can be a computing device, a communication device, a storage device, or any electronic device capable of running the software component 104, wherein the host contains at least a processor, a volatile storage (memory), and a non-volatile storage (not shown). For non-limiting examples, a host can be but is not limited to, a laptop PC, a desktop PC, a tablet PC, an iPod, a PDA, or a server machine. A storage device can be but is not limited to a hard disk drive, a solid state storage device such as a flash memory drive, or any portable storage device. A communication device can be but is not limited to a mobile phone.

In the example of FIG. 1, network 112 over which Web services 108 may be invoked by the business application 108 via Web service interface 110 can be but is not limited to, a local area network (LAN), wide area network (WAN), metropolitan area network (MAN), global area network such as the Internet, a Fibre Channel fabric, or any combination of such interconnects.

In the example of FIG. 1, the Web service interface 110 coupled to or integrated with the business application 104 on the client side and the storage management services 110 on the server side provides the web services 108 as storage functionalities, such that business applications, e.g. SAP or other vendor's business applications, can use them as part of their deployment processes for new application deployment. Here, Web service interface 110 is a software component that enables the business application 104 to access storage management services 108 following certain protocols. Once the operations and functionalities of the Web services 108 for storage management are determined, the Web service interface can be designed around such operations to include the parameters for these operations, their return values, and any errors or exceptions that they can generate.

While the system 100 depicted in FIG. 1 is in operation, the set of Web services 108 for storage management is provided to the business application 104 over network 112. The business application 104 may then invoke these Web services via Web service interface 110. During the deployment of its underlying database 106, the business application 104 may utilize storage provisioning services 114 to create, clone, copy, split or delete storage volumes on the storage server 102 in order to enable fast and automated deployment of the application. During its operation, the business application 104 may utilize application system services 116 to backup, restore, and recover database 106 to ensure consistency during backups as well as point-in-time recover after a system restore.

In the example of FIG. 1, the comprehensive set of web-services 108 for management of the storage server 102 may be used to implement storage management services in order to integrate them into SAP or other business applications 104. These web services 108 allow for tight integration of storage management services into business processes, and thus help to optimize and adapt storage resources on-demand according to actual business requirements.

In the example of FIG. 1, there are two major sets of storage management services 108 provided by the Web service interface 110—Storage provisioning services 114 and Application system services 116.

In the example of FIG. 1, storage provisioning services 114 allow integration of storage provisioning into the business application, e.g., SAP system, deployment process as web-services 108 so that the storage volumes on the storage server 102 can be reconfigured, copied, cloned or deleted directly out of the business application 104 via the Web-services interface 110, and just-in-time, such that these services become part of the business application 108. Such integration leads to automate the deployment of the application and cuts down deployment times from several hours to a few minutes in some cases. For a non-limiting example, the database 106 for the deployment of the business application 108 can be cloned from a pre-configured template instead of recreated from start.

In the example of FIG. 1, storage provisioning services 114 include but are not limited to the following storage operations:

Create, which creates one or more new volumes of storage on the storage server 102 based on the data provided within the storage specifications. This operation will either create all the requested storage or will none will be created and there is no partial success for this operation. For a non-limiting example, it fails if any of the named storage volumes already exist.

Clone, which creates one or more new volumes of storage that are exact replicas of a specified source volume. Source storage volumes must already exist, destination volumes must not, and both the source and destination volumes must be identified within the same storage server 102. This operation will either create all the requested clone volumes or none will be created and there is no partial success for this operation. The cloned volume is not available for access until this operation completes.

Copy, which creates a new volume that is exact replicas of a specified source volume, but within the namespace of a different storage system. Source storage volume must already exist and the destination volume must not. This operation will either create the requested copied volume or none will be created and there is no partial success for this operation. The copied volume is not available for host level access until this operation completes.

Split, which splits an existing cloned volume or otherwise ensure that the volume does not rely on underlying shared storage with any other volume. The namespace volume must exist as a storage volume. This operation will succeed when that volume no longer shares underlying storage with another volume. Canceling of this operation while it is in progress will discontinue any further storage level split activity, but the split activity already performed will remain complete.

Destroy/delete, which deletes one or more volumes of storage from the storage server 102. Volumes must exist within the storage system. Once the volume is deleted, it cannot be recovered. Additionally, because of the irreversible nature of a volume deletion, this service has a semantic similar to a Unix style rm command when more than one volume is requested for delete. Any volume which can be deleted and any volume that has some type of error occur during the deletion process will be warned, but the operation will be successful as a whole.

In the example of FIG. 1, application system services 116 are related to the maintenance of the business application 108. This set of services provides a tight integration into the database layer of database 106 to ensure consistency during backups as well as point-in-time recover after a system restore. By utilizing these application system services through the Web service interface 110, an external business application like 104 can be used to manage the operation of its own underlying database 106 or the database of other application systems by triggering backups, restores, recovers and archived log backup of the database 106. Such integration helps to reduce costs caused by manual intervention of IT operators as well as just-in-time response of storage management services to business requirements.

Among the set of application system services 116, archived log Backup performs a backup of (database) files (e.g., archived database logs) whose names match a given regular expression (e.g., a|b*) from a primary storage location to a secondary storage location where file system and structure of the secondary storage location mimics the file system and structure of the primary storage location. Here, the storage location refers to one or more storage volumes on the primary or secondary storage devices, respectively. The backup operation may purge (permanently delete) protected primary files and/or secondary file as well unless caller (e.g., the database) of the operation prefers otherwise. However, a file will not be purged from the primary storage location if it does not already exist on the secondary. During the backup operation, files that appear to have been modified will be backed up again and previous copies of these files will be saved in a sub-directory under the name/id of the current operation. Files that are among the most recently modified files on the primary may or may not be backed up again from primary to secondary at the caller's discretion.

Figure 2:
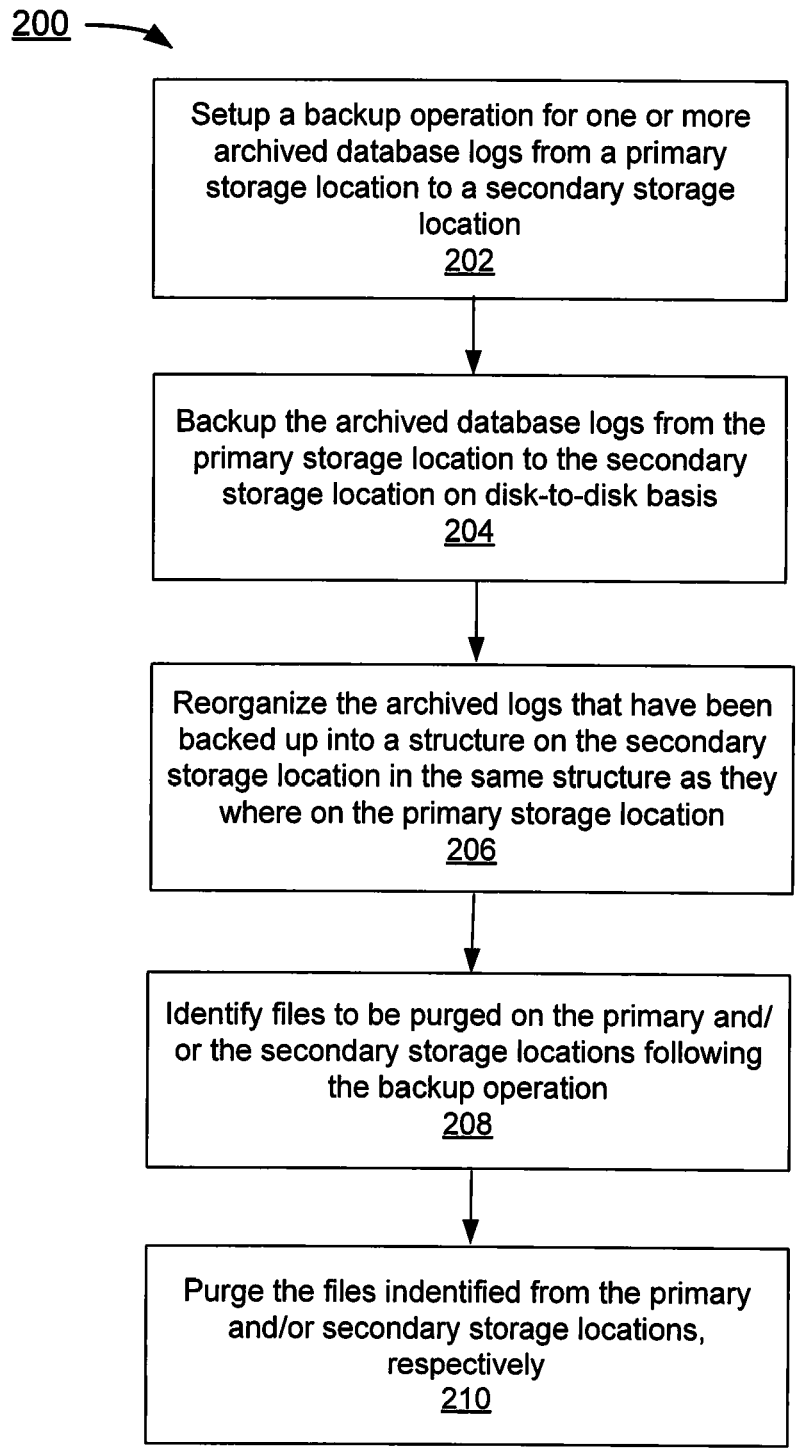
FIG. 2 depicts a flowchart of an example of a process to support database archived log backup.

FIG. 2 depicts a flowchart 200 of an example of a process to support archived database log backup. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

The flowchart 200 starts to block 202 where a backup operation for one or more archived database logs from a primary storage location to a secondary storage location is setup (prepared for). Here, the setup of the backup operation includes but is not limited to, validating inputs to the operation, calculating which and/or when the archived logs need to be reorganized, backed up, or purged on the primary and/or secondary storage location, querying the storage server for preferred network interface for incremental block transfer between the primary and secondary storage locations, and creating a relationship from the primary storage location to the secondary storage location if such a relationship was not previously created for incremental block transfer (e.g., snapvault). Here, both the primary and the secondary storage locations can be specified as a path of storage volume, which holds primary and secondary storage partitions of archived database files, respectively.

In some embodiments, a primary and a secondary retention periods of the one or more archived database logs can be specified as part of the setup process, where the primary retention period is measured from the time beyond which such archived logs should be backed up and maintained on the secondary storage, and the secondary retention period is measured from the time of the archived database files are backed up at the secondary storage location beyond which such archived logs should be purged the secondary storage. Here, the primary and the secondary retention periods are being set without considering limits on number of snapshots allowed on the primary and the secondary storage locations The flowchart 200 continues to block 204 where the archived database logs are backed up from the primary storage location to a secondary storage location on disk-to-disk basis (e.g., copying the contents of one computer hard disk at the primary storage location to another hard disk at the secondary storage location). Blocks of (e.g., snapshot of) the archived logs on the primary storage located are transferred to the volumes on the secondary storage location. Here, only log files with the changed blocks are being transferred if a transfer from the primary storage location to the secondary storage location has been done in a previous archived log backup run. Once the files are backed up to the secondary storage location, the files may optionally be purged from the primary storage location.

The flowchart 200 continues to block 206 where archived logs that have been transferred from the primary storage location to the secondary storage location are reorganized into a structure on the secondary storage location in the same structure as they where on the primary storage location. Here, only a limited amount of archive log reorganizations is started in parallel and all un-necessary complexity is hidden from the user, e.g. the need to locate the files within a set of snapshots, which are persistent point in time images (PPTI). Such reorganization of files overcomes boundaries implied by technologies that deal with storage containers rather than individual files. This reorganization step can be until all new archived logs transferred from the primary storage location are reorganized.

The flowchart 200 ends at block 208 where a purge list of files is created, wherein the list identifies one or more of the following files to be purged from the primary and/or secondary storage locations following the backup operation: all expired archived logs on the primary storage location that have been backed up in a previous archive log backup call given a defined primary retention period, all expired archived logs on the secondary storage location given a defined secondary retention period, snapshots of volume of the achieved logs on the primary and the secondary storage locations from the earlier and/or current backup operations.

The flowchart 200 ends at block 210 where files in the purge list are purged from the primary and/or secondary storage locations, respectively.

Under the approach depicted in FIG. 2, the primary and the secondary retention periods applied on the primary and the secondary storage locations respectively can be arbitrarily set without considering limits on number of snapshots allowed on the primary and secondary storage locations. In some embodiments, the first and the second retention periods may differ. For a non-limiting example, the primary retention period on the primary storage location can be chosen to by much shorter (typically several days), then the secondary retention period on the secondary storage location (typically several weeks).

Under the approach depicted in FIG. 2, the archived log backup calls are also database agnostic, e.g., archived log backups from many databases can be consolidated within a single storage volume on the primary storage location plus a backup volume on the secondary storage location.

Figure 3:
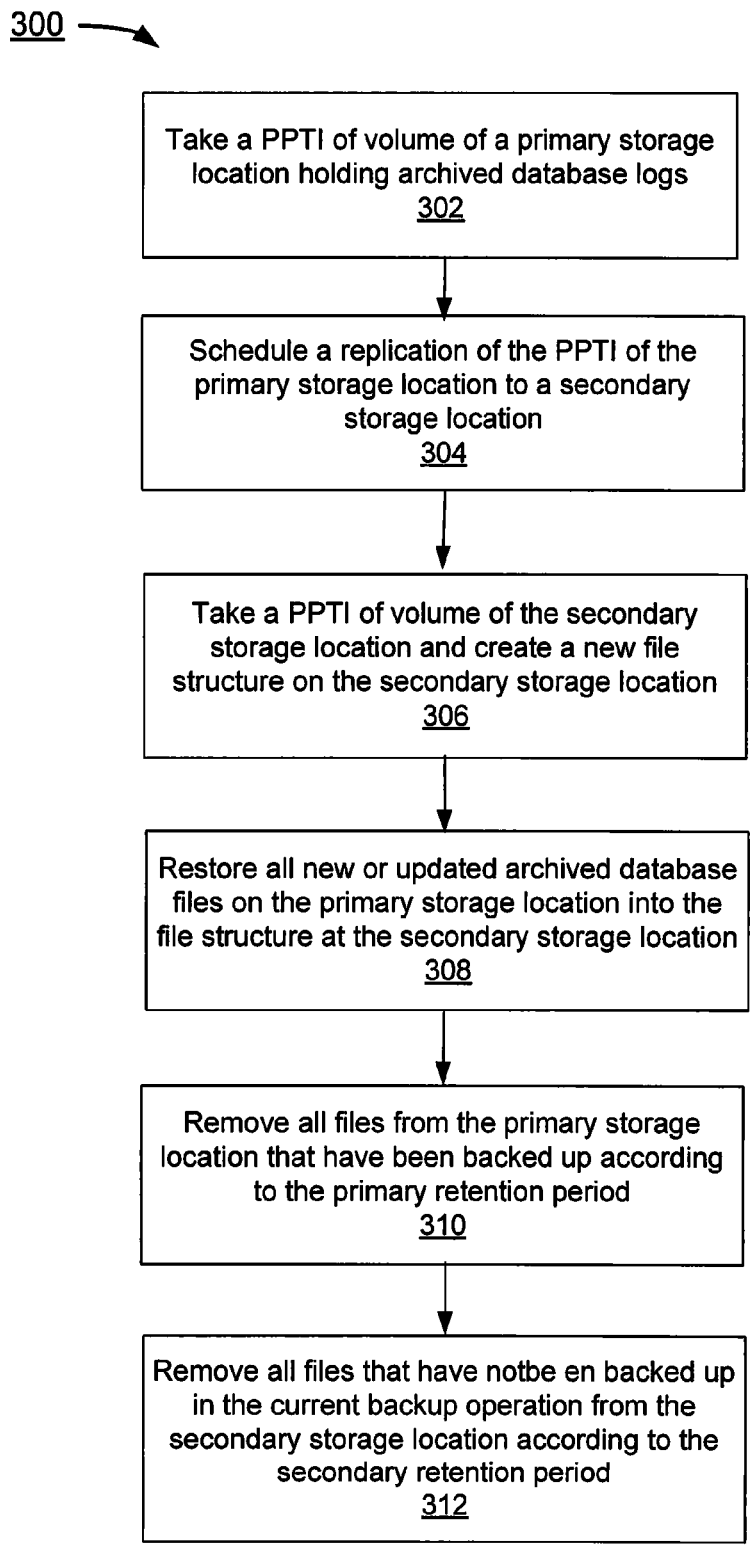
FIG. 3 depicts a flowchart of an example of a process to support database archived log backup from the primary storage location to the secondary storage location implemented as a single web services call.

FIG. 3 depicts a flowchart 300 of an example of a process to support database archived log backup from the primary storage location to the secondary storage location implemented as a single web services call.

In the example of FIG. 3, the flowchart 300 starts at block 302, where a snapshot is taken of the volume(s) of the primary storage location of the archived database logs. As used herein, a "snapshot" is a persistent point-in-time image (PPTI) of data. In one embodiment, a snapshot includes a read-only, persistent, point-in-time image of data, such as a storage volume or a logical unit number (LUN). Blocks that may be referenced when a PPTI is enabled may include, for example, blocks that store PPTI files, an associated data image, etc.

The flowchart 300 continues to block 304 where a relationship between the PPTI of the primary storage location and its replication on a relatively inexpensive secondary storage is created and a block-based incremental backup is scheduled (e.g., "snapvaulted", wherein Snapvault is a product commercially available from NetApp of Sunnyvale, Calif.). Such disk-to-disk backup relationship moves and stores data efficiently by eliminating redundant data across each backup. It is fast, centralized, and cost-effective and it ensures that important data is always protected and easily restored. Unlike traditional backups that store data on tape in proprietary formats accessible only through the backup application, the archived log backup operation described herein creates online backup archives in an accessible file system format on the secondary storage location, from which users and/or administrators can securely and rapidly search and recover data directly from the backups. It also provides near-instant disaster recovery by enabling users and applications to failover directly to the backup copy.

The flowchart 300 continues to block 306 where a PPTI is taken of the volume(s) of the secondary storage location and a new file structure such as "qtree" is created on the secondary storage location. As used herein, a qtree is a special subdirectory of the root directory of a volume that gives greater flexibility when storage needs do not demand multiple volumes. Volumes are themselves considered a qtree and can be the target of qtree commands.

The flowchart 300 continues to block 308 where all new or updated versions of the archived database files on the primary storage location are restored into the secondary volume read/write qtrees. Such restoration of files can be accomplished via a "single file snapshot restore" operation, which reverts the files on secondary storage to a revision from the specified PPTI of the primary storage location.

The flowchart 300 continues to block 310 where all files from the primary storage location that have been backed up in previous backup operations are removed according to the primary retention period. The flowchart 300 ends at block 312 where all files that have not been backed up in the current backup operation can be removed from the secondary storage location according to the secondary retention period.

Under the approach depicted in FIG. 3, the advantages of storage container related functionalities and the ease and simplicity of a file based backup solution (e.g., Snaprestore, which is a product commercially available from NetApp of Sunnyvale, Calif.) are combined to offer a backup solution for archived database log files in such a way as they would have been backed up by a file based solution. PPTIs can be removed after the single file snap-restore to the secondary storage location, which overcomes limits on the maximum numbers of PPTIs allowed.

In some embodiments, only a selected set of the archived database logs, instead of the entire set, are backed up from the primary storage location to the secondary storage location. Such selection can be done, by way of illustration not limitation, via a regular expression that defines the file naming pattern to be used to select the database files to be backed up. Archived logs are matched against the regular expression to distinguish them from other files, e.g. message or error log files. In addition, the most recently archived file at the primary storage location may be protected against potential backups when that file is in the process of being written by a database engine.

In some embodiments, database archived logs on the primary and the secondary storage locations are compared. If an update to a database archived log is detected, the archived log will be backed up again (after creating a backup copy of the previous version). If an archived log is among the newest archived logs on either the primary or the secondary storage location, it will be either (1) be removed from the list of files to be backed up by the single file snap restore operation, and thus effectively not backed up in the current but a later run, or (2) backed up again, even though it has been backed up already in a previous call. By checking for potentially updated archived database files since the last creation of the source PPTI, such an approach overcomes the risk of an incomplete archived log due to PPTI created during an archived log switch that could cause an unrecoverable failure during a point in time recovery.

Figure 4:
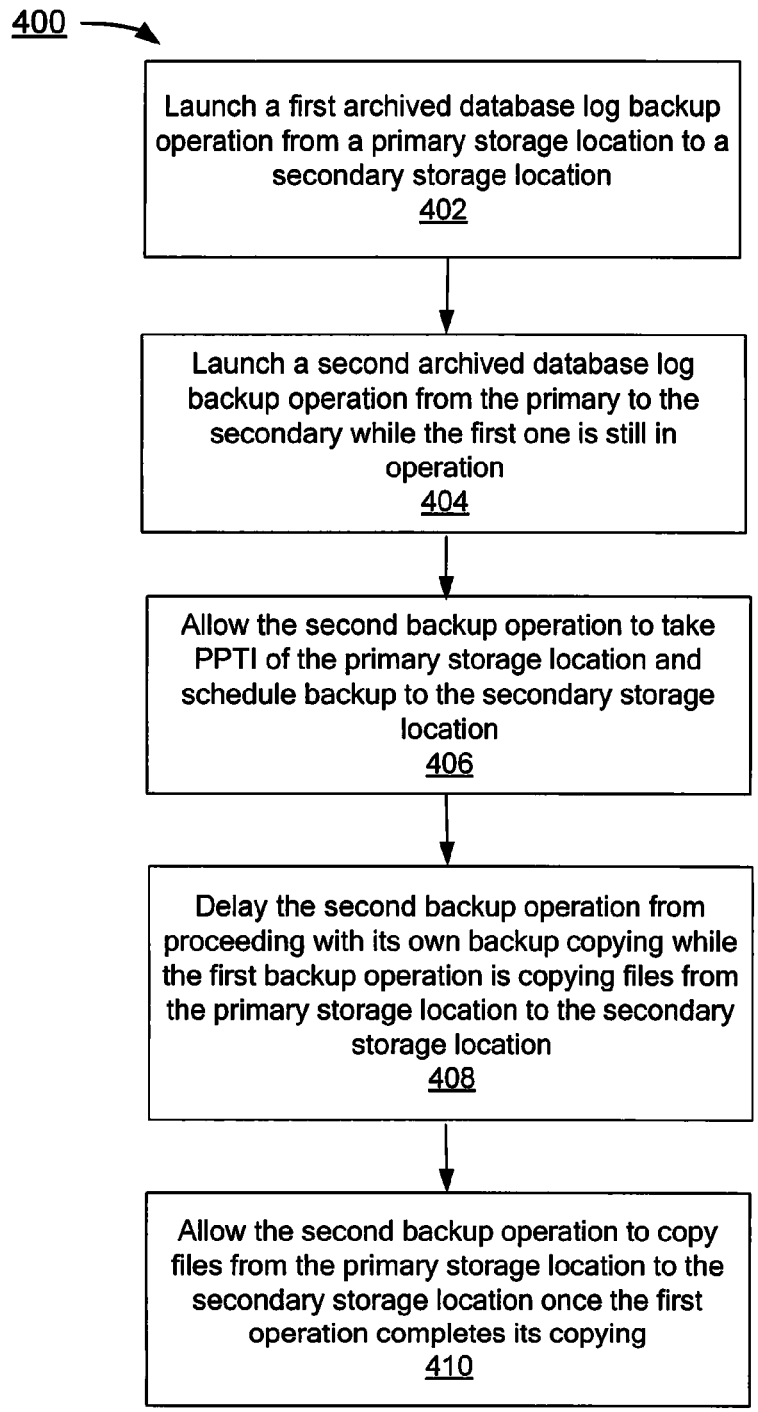
FIG. 4 depicts a flowchart of an example of a process to support backup multiple database archived log backup operations executed simultaneously for a primary/secondary storage location pair.

FIG. 4 depicts a flowchart 400 of an example of a process to support backup multiple database archived log backup operations executed simultaneously by one or more users of database 106 for a primary/secondary storage location pair.

In the example of FIG. 4, the flowchart 400 starts at block 402, where a first archived database log backup operation is launched from a primary storage location to a secondary storage location. The flowchart 400 continues to block 404 where an archived database log backup operation is launched from the primary to the secondary while the first one is still in operation. The flowchart 400 continues to block 406 where the second backup operation is able to take its PPTI on the primary storage location and schedule the backup to the secondary storage location. The flowchart 400 continues to block 408 where the second backup operation is delayed while the first backup operation is copying files from the primary storage location to the secondary storage location before proceeding with its own backup copying. The flowchart 400 ends at block 410 where the second backup operation proceeds to copy files from the primary storage location to the secondary storage location once the first operation complete its copying.

Under the approach depicted in FIG. 4, multiple backup operations that are running are synchronized to ensure that only one of them is in the copying phase of the single file PPTI restore operation. On the other hand, the archived database logs will be protected in the sense that they have been scheduled to be copied to secondary storage as requested by the second backup operation, even though the actual copying may be delayed while the proceeding first operation is completing.

Figure 5:
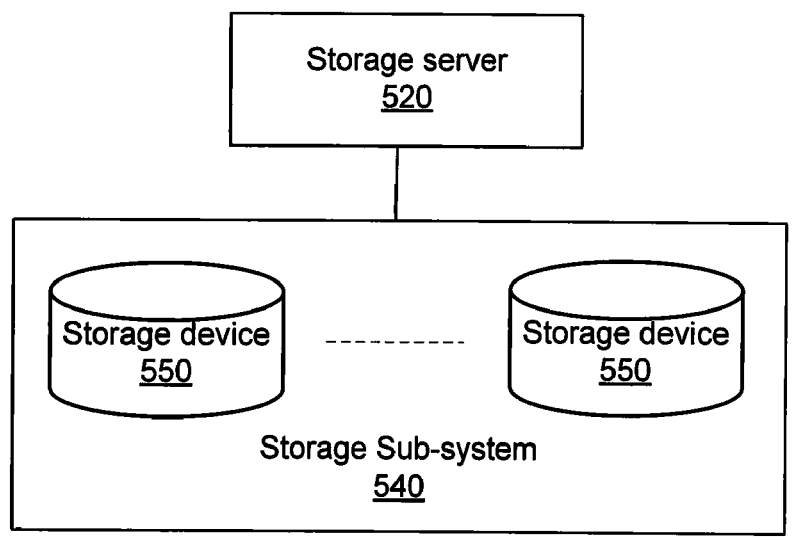
FIG. 5 shows a network environment in which the techniques introduced here the may be implemented.

FIG. 5 shows a network environment 500 in which the techniques introduced here may be implemented. The various embodiments described herein are not limited to any particular environment, and may be implemented in various storage processes. In the present illustration, the storage server 520 (102 in FIG. 1) is coupled with a mass storage subsystem 540, which includes a set of mass storage devices 550. The mass storage subsystem 540 is managed by the storage server 520. For a non-limiting example, the storage server 520 may receive and respond to various read and write requests from the business application 104 invoking storage management services 108 over network 112, directed to data stored in or to be stored in the storage subsystem 540 where database 106 resides. The mass storage devices 550 in the mass storage subsystem 540 may be, for a non-limiting example, magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data.

In the example of FIG. 5, the storage server 520 may have a distributed architecture; for a non-limiting example, storage server 520 may include separate N-module (network module) and D-module (data module) components (not shown). In such an embodiment, the N-module is used to communicate with the business application 104 via Web service interface 110, while the D-module includes the file system functionality and is used to communicate with the storage subsystem 640. In another embodiment, the storage server 520 may have an integrated architecture, where the network and data components are all contained in a single box or unit. The storage server 520 further may be coupled through a switching fabric to other similar storage systems (not shown) that have their own local storage subsystems. In this way, all of the storage subsystems can form a single storage pool, to which any client of any of the storage systems has access.

Figure 6:
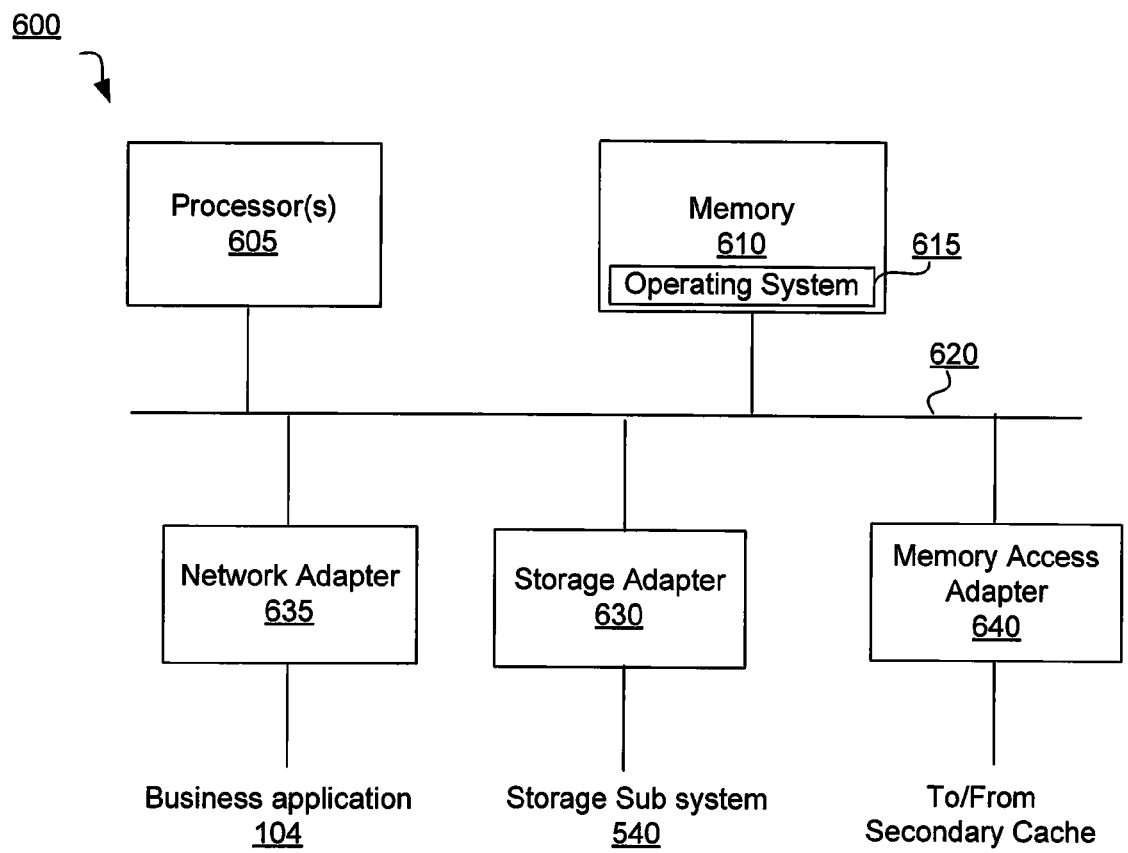
FIG. 6 is a high-level block diagram showing an example of the architecture of a storage server.

FIG. 6 is a high-level block diagram showing an example of the architecture of a storage server 600 (102 in FIG. 1). The storage server 600 includes one or more processors 605 and memory 610 coupled to a interconnect 620. The interconnect 620 shown in FIG. 6 is an abstraction that represents any one or more separate physical buses, point-to-point connections, or both connected by appropriate bridges, adapters, or controllers. The interconnect 620, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

In the example of FIG. 6, the processor(s) 605 may include central processing units (CPUs) of the storage server 600 and, thus, control the overall operation of the storage server 600. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

In the example of FIG. 6, the memory 610 is or includes the main memory of the storage server 600. The memory 610 represents any form of random access memory (RAM), read-only memory (ROM), flash memory, or the like, or a combination of such devices. In use, the memory 610 stores, among other things, the operating system 615 of the storage server 600.

In the example of FIG. 6, a storage adapter 630 and a network adapter 635 are also connected to the processor(s) 605 through the interconnect 620. The storage adapter 630 allows the storage server 600 to access a storage subsystem 540 and may be, for example, a Fibre Channel adapter or a SCSI adapter. The network adapter 635 provides the storage server 600 with the ability to communicate with remote devices, such as business application 108, over a network 112 and may be, for example, a Fibre Channel adapter or a SCSI adapter.

In the example of FIG. 6, the storage server 600 also includes a memory access adapter 640 coupled to the interconnect 620, to enable the processor(s) 605 to access the secondary cache (not shown). In some embodiments, the secondary cache is external to the storage server 600. In other embodiments, the secondary cache is physically attached to the main motherboard (not shown) of the storage server 600. In still other embodiments, the secondary cache is implemented on a separate substrate within the storage server 600 or on a substrate that attaches to a connector on the storage server 600.

Figure 7:
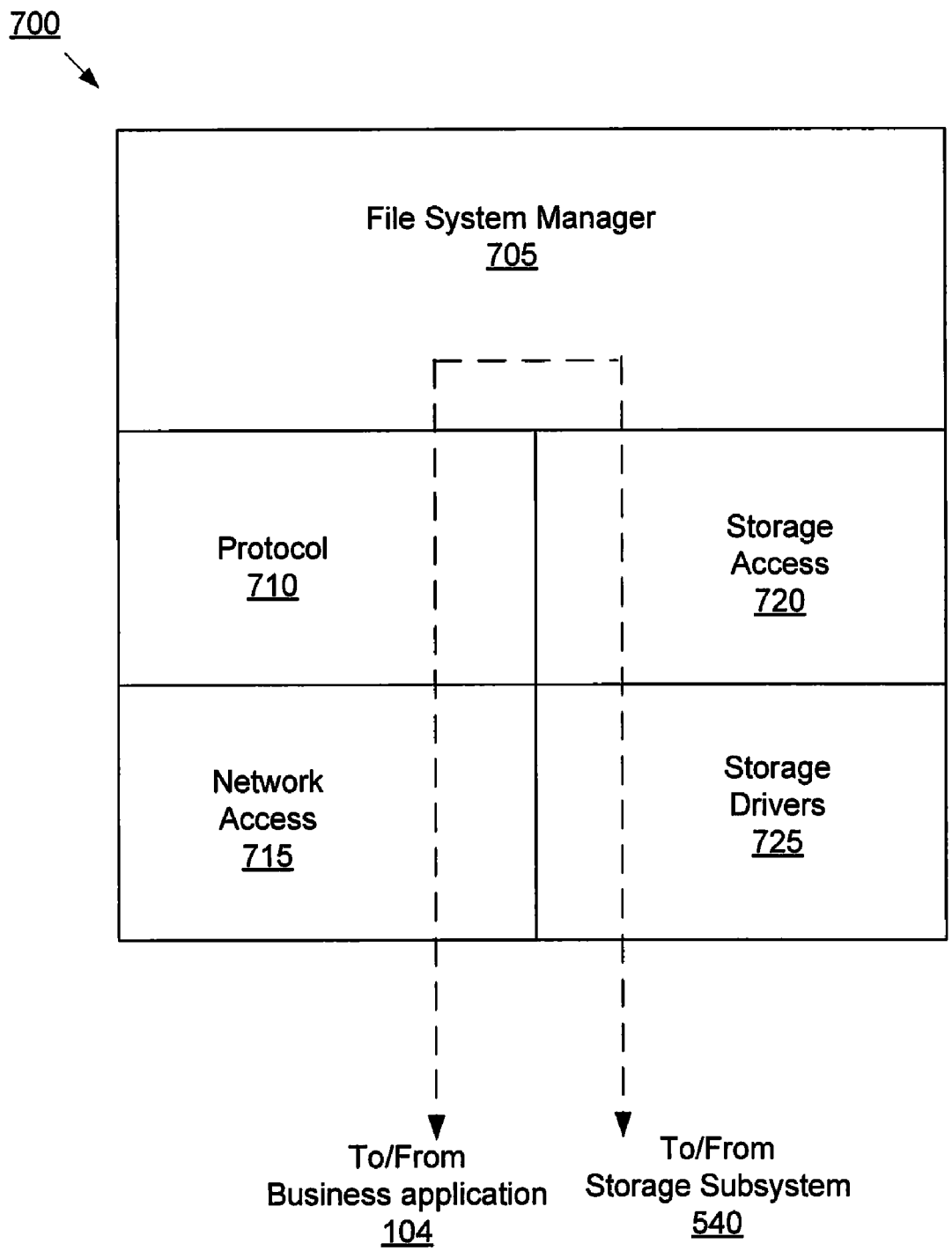
FIG. 7 illustrates an example of the operating system of the storage server.

FIG. 7 illustrates an example of the operating system 700 of the storage server 600. As shown, the operating system 700 includes several modules, or "layers." These layers include a file system manager 705. The file system manager 705 is software that keeps track of the directory structure (hierarchy) of the data stored in a storage subsystem and manages read/write operations on the data (i.e. executes read/write operations on the disks in response to client requests).

The operating system 700 also includes a protocol layer 710 and an associated network access layer 715, to allow a file server to communicate over a network to other systems, such as clients. The protocol layer 710 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 715 includes one or more drivers, which implement one or more lower-level protocols to communicate over the network, such as Ethernet. Interactions between clients and mass storage devices (e.g., disks) are illustrated schematically as a path, which illustrates the flow of data through the operating system 700.

The operating system 700 further includes a storage access layer 720 and an associated storage driver layer 725 to allow a file server to communicate with a storage subsystem. The storage access layer 720 implements a higher-level disk storage protocol, such as RAID, while the storage driver layer 725 implements a lower-level storage device access protocol, such as Fibre Channel Protocol (FCP) or SCSI. In one embodiment, the storage access layer 720 may implement a RAID protocol, such as RAID-4 or RAID-DP™ (RAID double parity for data protection provided by Network Appliance, Inc.), and therefore may alternatively be referred to as RAID layer 720.

Thus, a method and apparatus for support archived database log backup from a primary storage location to a secondary storage location has been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that stores information in a form accessible by a machine (e.g., a computer, network device, personal digital assistant (PDA), any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method, comprising:
    launching a first backup operation of archived database log files from a primary storage location to a secondary storage location, wherein each database log file of the archived database log files is for keeping track of storage operations performed on data stored in a database corresponding to the primary storage location, wherein the backup operation excludes archived database log files that are currently being edited at the primary storage location from being backed up to the secondary storage location, wherein network traffic of the first backup operation is separate from traffic between a host of the database and its network;
    taking a persistent point in time image (PPTI) of storage volume of the secondary storage location and creating a new file structure on the secondary storage location;
    launching a second backup operation of archived database log files from the primary storage location to the secondary storage location while the first backup operation is still in operation, wherein network traffic of the second backup operation is separate from traffic between a host of the database and its network;
    permitting the second backup operation to take PPTI of the primary storage location and to schedule backup to the secondary storage location;
    delaying the second backup operation from proceeding with copying files while the first backup operation is copying files from the primary storage location to the secondary storage location; protecting the most recently archived file at the primary storage location against potential backups when that file is in the process of being written by a database engine;
    permitting the second backup operation to proceed with copying files from the primary storage location to the secondary storage location once the first backup operation completes its copying;
    checking for potentially updated archived database files since last PPTI of the primary storage location; and
    preventing risk of backing up an incomplete archived database file from a PPTI created during an archived log switch.

2. A method as recited in claim 1, further comprising:
    removing all files from the primary storage location that have been backed up.

3. A method as recited in claim 1, further comprising:
    removing all files that have not been backed up in the current backup operation from the secondary storage location.

4. A method as recited in claim 1, further comprising:
    removing the PPTI of the primary storage location after the backing up.

5. A method as recited in claim 1, further comprising:
    selecting a subset of the set of archived database files for backing up from the primary storage location to the secondary storage location.

6. A method as recited in claim 5, further comprising:
    selecting the subset of the set of archived database files via a regular expression that defines the file naming pattern of the files to be backed up.

7. A storage server comprising:
    a processor that enable a remote client to perform a set of storage management operations on a storage subsystem coupled to the storage server, wherein the storage subsystem includes a plurality of non-volatile mass storage devices;
    a network interface through which the client communicates with the storage server over a network;
    a storage interface through which the storage server accesses the storage subsystem;
    a storage system manager embodied in a machine readable medium wherein, in operation:
    launch a first backup operation of archived database log files from a primary storage location to a secondary storage location, wherein each database log file of the archived database log files is for keeping track of storage operations performed on data stored in a database corresponding to the primary storage location, wherein the backup operation excludes archived database log files that are currently being edited at the primary storage location from being backed up to the secondary storage location, wherein network traffic of the first backup operation is separate from traffic between a host of the database and its network;
    capture a persistent point in time image (PPTI) of storage volume of the secondary storage location and creating a new file structure on the secondary storage location;
    launch a second backup operation of archived database log files from the primary storage location to the secondary storage location while the first backup operation is still in operation, wherein network traffic of the second backup operation is separate from traffic between a host of the database and its network;
    permit the second backup operation to take PPTI of the primary storage location and to schedule backup to the secondary storage location;
    delay the second backup operation from proceeding with copying files while the first backup operation is copying files from the primary storage location to the secondary storage location; protect the most recently archived file at the primary storage location against potential backups when that file is in the process of being written by a database engine;
    permit the second backup operation to proceed with copying files from the primary storage location to the secondary storage location once the first backup operation completes its copying;
    check for potentially updated archived database files since last PPTI of the primary storage location; and
    prevent risk of backing up an incomplete archived database file from a PPTI created during an archived log switch.

8. The storage server of claim 7, wherein the storage system manager, further in operation:
    removes all files from the primary storage location that have been backed up.

9. The storage server of claim 7, wherein the storage system manager, further in operation:
removes all files that have not been backed up in the current backup operation from the secondary storage location.

10. The storage server of claim 7, wherein the storage system manager, further in operation:
removes the PPTI of the primary storage location after the backing up.

11. The storage server of claim 7, wherein the storage system manager, further in operation:
selects a subset of the set of archived database files for backing up from the primary storage location to the secondary storage location.

12. The storage server of claim 11, wherein the storage system manager, further in operation:
selects the subset of the set of archived database files via a regular expression that defines the file naming pattern of the files to be backed up.

* * * * *